(12) United States Patent
Chiba et al.

(10) Patent No.: US 12,509,743 B2
(45) Date of Patent: Dec. 30, 2025

(54) STEEL SHEET, MEMBER, AND METHODS FOR MANUFACTURING THE SAME

(71) Applicant: JFE Steel Corporation, Tokyo (JP)

(72) Inventors: Tadachika Chiba, Tokyo (JP); Shinjiro Kaneko, Tokyo (JP); Yoichiro Matsui, Tokyo (JP); Noriaki Kosaka, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 461 days.

(21) Appl. No.: 17/920,851

(22) PCT Filed: Apr. 28, 2021

(86) PCT No.: PCT/JP2021/016903
§ 371 (c)(1),
(2) Date: Oct. 24, 2022

(87) PCT Pub. No.: WO2021/230079
PCT Pub. Date: Nov. 18, 2021

(65) Prior Publication Data
US 2023/0203615 A1    Jun. 29, 2023

(30) Foreign Application Priority Data

May 11, 2020    (JP) .................................. 2020-082990

(51) Int. Cl.
| | | |
|---|---|---|
| *C21D 9/46* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/58* | (2006.01) |
| *C22C 38/60* | (2006.01) |

(52) U.S. Cl.
CPC .............. *C21D 9/46* (2013.01); *C21D 6/001* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/001* (2013.01); *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/58* (2013.01); *C22C 38/60* (2013.01); *C21D 2211/001* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | | |
|---|---|---|---|---|
| 2014/0242416 A1* | 8/2014 | Matsuda | ............... | C22C 38/001 148/333 |
| 2015/0337416 A1* | 11/2015 | Zhong | ...................... | C21D 9/46 148/320 |
| 2020/0283862 A1 | 9/2020 | Tsuchihashi et al. | | |

FOREIGN PATENT DOCUMENTS

| | | |
|---|---|---|
| AU | 2013200660 A1 | 2/2013 |
| CN | 103857819 A | 6/2014 |
| CN | 105452513 A | 3/2016 |
| CN | 108699646 A | 10/2018 |
| EP | 2765212 A1 | 8/2014 |
| EP | 3012339 A1 | 4/2016 |
| EP | 3418414 A1 | 12/2018 |
| EP | 3584347 A1 | 12/2019 |
| EP | 3845674 A1 | 7/2021 |
| EP | 3868909 A1 | 8/2021 |
| JP | 2004225109 A | 8/2004 |
| JP | 3583306 B2 | 11/2004 |
| JP | 2008291304 A | 12/2008 |
| JP | 2016503458 A | 2/2016 |
| JP | 2020019992 A | 2/2020 |

(Continued)

OTHER PUBLICATIONS

Chinese Office Action with Search Report for Chinese Application No. 202180031122.5, dated Jul. 18, 2023, 10 pages.
Extended European Search Report for European Application No. 21803238.1, dated Sep. 6, 2023, 8 pages.

(Continued)

*Primary Examiner* — Jenny R Wu
(74) *Attorney, Agent, or Firm* — Buchanan Ingersoll & Rooney PC

(57) ABSTRACT

A steel sheet has a specified chemical composition and a specified steel microstructure. An average grain size of ferrite and/or bainitic ferrite is 7.0 μm or less. On the basis of a distribution in the width direction of the steel sheet, a ratio of a deviation of the grain size of the ferrite and/or the bainitic ferrite to the average grain size of the ferrite and/or the bainitic ferrite is 10% or less. On the basis of a distribution in the width direction of the steel sheet, a ratio of a deviation of the area fraction of as-quenched martensite to the area fraction of the as-quenched martensite is 10% or less. On the basis of a distribution in the width direction of the steel sheet, a ratio of a deviation of the area fraction of retained austenite to the area fraction of the retained austenite is 10% or less.

20 Claims, No Drawings

(56) References Cited

FOREIGN PATENT DOCUMENTS

| KR | 10-2014-0068207 A | 6/2014 |
|---|---|---|
| WO | 2019107042 A1 | 6/2019 |
| WO | 2020080339 A1 | 4/2020 |
| WO | 2020080401 A1 | 4/2020 |

OTHER PUBLICATIONS

International Search Report and Written Opinion for International Application No. PCT/JP2021/016903, dated Jul. 27, 2021, 5 pages.
Office Action (Request for the Submission of an Opinion) issued Nov. 4, 2024, by the Korean Intellectual Property Office in corresponding Korean Patent Application No. 10-2022-7036467 and an English translation with Concise Statement of Relevance of the Office Action. (13 pages).

* cited by examiner

STEEL SHEET, MEMBER, AND METHODS FOR MANUFACTURING THE SAME

CROSS REFERENCE TO RELATED APPLICATIONS

This is the U.S. National Phase application of PCT/JP2021/016903, filed Apr. 28, 2021 which claims priority to Japanese Patent Application No. 2020-082990 filed May 11, 2020, the disclosures of these applications being incorporated herein by reference in their entireties for all purposes.

FIELD OF THE INVENTION

The present invention relates to a steel sheet, a member, and methods for manufacturing the steel sheet and the member. More specifically, aspects of the present invention relate to a steel sheet having a tensile strength (TS) of 590 MPa or higher, excellent formability, and excellent stability of mechanical properties, a member, and methods for manufacturing the steel sheet and the member. The steel sheet according to aspects of the present invention can preferably be used as a material for automobile frame members.

BACKGROUND OF THE INVENTION

Nowadays, from the viewpoint of global environment conservation, $CO_2$ emission regulations for automobiles are being tightened in the international framework. To improve the fuel efficiency of automobiles, reducing the weight of automobiles by reducing the thickness of a steel sheet used for automobile frame members is most effective. Therefore, to contribute to improving the fuel efficiency of automobiles, the amount of high strength steel sheets used is being increased.

On the other hand, automobile frame members are required to have high formability. Nowadays, ensuring the crashworthiness of automobile body frame members and reducing the weight of the members used through topology optimization on the basis of the shape of the members are being promoted to enable development of automobiles having high crashworthiness and fuel efficiency. Therefore, since it is expected that high strength members having more complex shapes than previously are used for automobiles, there is a demand for a high strength steel sheet having high formability. Here, the term "formability" denotes ductility (total elongation (%)) and stretch flange formability (hole expansion ratio $\lambda$ (%)).

Generally, since strength and formability are properties which conflict with each other, an improvement in strength is accompanied by a decrease in formability. Examples of a method for improving the formability of a high strength steel sheet include one utilizing a TRIP (Transformation Induced Plasticity) steel sheet in which retained austenite is used as a constituent microstructure, and various techniques regarding such a method have been disclosed.

However, in the case of a high strength steel sheet having a tensile strength of 590 MPa or higher, since there is an increased variation in strength, ductility, or stretch flange formability, there is a problem of a variation in the dimensions of a product due to spring back, the occurrence of local cracking, or the like, which results in a decrease in productivity. Therefore, since there is a demand for concurrent excellent formability and high stability of mechanical properties, there is a demand for manufacturing a coil product having a decreased variation in mechanical properties throughout the length and width thereof by using a manufacturing method which is as simple as possible.

Patent Literature 1 states that, by allowing element partitioning from ferrite to austenite to occur by performing dual-phase annealing in a temperature range of higher than 800° C. and lower than the $Ac_3$ transformation temperature, and by dividing a cooling step after annealing has been performed into two stages, that is, a rapid cooling stage and a gradual cooling stage, since transformation from austenite to bainite rapidly progresses, a microstructure including ferrite, bainite, and 3% or more of retained austenite is formed, which makes it possible to achieve uniform mechanical properties in the width direction while improving the ductility of a high strength steel sheet having a tensile strength of 550 MPa or higher.

PATENT LITERATURE

PTL 1: Japanese Patent No. 3583306

SUMMARY OF THE INVENTION

However, in the case of the technique according to Patent Literature 1, it is considered that ferrite transformation occurs in a cooling process depending on the chemical composition of a steel sheet. In this case, since it is not possible to promote transformation from austenite to bainite as described in Patent Literature 1, it is not possible to achieve high ductility while ensuring the stability of mechanical properties.

Aspects of the present invention have been completed in view of the situation described above, and an object according to aspects of the present invention is to provide a steel sheet having a tensile strength of 590 MPa or higher, excellent formability, and excellent stability of mechanical properties, a member, and methods for manufacturing the steel sheet and the member.

To solve the problems described above, the present inventors diligently conducted investigations regarding factors for obtaining a steel sheet having a tensile strength of 590 MPa or higher, excellent formability, and excellent stability of mechanical properties by utilizing a TRIP steel sheet.

Examples of a known annealing process for manufacturing a TRIP steel sheet include a QP (Quenching and Partitioning) process and an austempering process.

In a QP process, by cooling a steel sheet to a temperature equal to or lower than the martensite transformation temperature (Ms temperature) and equal to or higher than the martensite transformation finish temperature (Mf temperature) in a process after an annealing treatment has been performed and before an over-aging treatment is performed, a portion of non-transformed austenite is allowed to transform into martensite. In addition, in a subsequent over-aging treatment, by utilizing carbon partitioning from a martensite microstructure to non-transformed austenite or carbon partitioning into non-transformed austenite due to bainite transformation, retained austenite is formed. Consequently, there is an improvement in ductility while high strength of a steel sheet is ensured.

However, in a QP process, in which quenching is performed, since cooling is promoted at the edges of a steel sheet when cooling is performed, there is an increase in the amount of martensite, which results in a tendency for properties to vary in the width direction.

Therefore, from the viewpoint of the stability of mechanical properties, it is preferable to perform an austempering process, in which, by performing isothermal holding to promote bainite transformation after cooling following annealing to an over-aging temperature has been performed, there is an improvement in ductility due to retained austenite being formed.

However, also in an austempering process, since bainite transformation continuously occurs when cooling is performed from an annealing treatment temperature and when isothermal holding is performed at an over-aging temperature, there may be a case where mechanical properties vary in the width direction. To solve such a problem, it is necessary to fundamentally revise the chemical composition of a steel sheet and a heat treatment process, thereby devising a new heat treatment process with which it is possible to accurately control ferrite transformation and bainite transformation when cooling is performed and bainite transformation when isothermal holding is performed at an over-aging temperature.

The present inventors diligently conducted investigations regarding conditions applied for the manufacturing of a TRIP steel sheet in an austempering process and, as a result, found that, by accurately controlling ferrite transformation and bainite transformation under certain manufacturing conditions to inhibit mechanical properties from varying in the width direction of a steel sheet, it is possible to obtain a steel sheet having a tensile strength of 590 MPa or higher, excellent formability, and excellent stability of mechanical properties.

Aspects of the present invention have been completed on the basis of the knowledge described above, and a summary of aspects of the present invention is as follows.

[1] A steel sheet having a chemical composition containing, by mass %:
C: 0.05% or more and 0.25% or less,
Si: 0.80% or more and 2.20% or less,
Mn: 0.80% or more and 3.0% or less,
P: 0.05% or less,
S: 0.005% or less,
Al: 0.70% or less,
N: 0.0060% or less, and
a balance being Fe and incidental impurities,
the steel sheet having a steel microstructure including, in terms of area fraction, ferrite and bainitic ferrite in a total amount of 60% or more and 90% or less, as-quenched martensite in an amount of 5% or more and 20% or less, retained austenite in an amount of 4% or more and 20% or less, and a balance being in an amount of 5% or less,
in which an average grain size of the ferrite and/or the bainitic ferrite is 7.0 µm or less,
in which, on the basis of a distribution in the width direction of the steel sheet, a ratio of a standard deviation of the grain size of the ferrite and/or the bainitic ferrite to the average grain size of the ferrite and/or the bainitic ferrite is 10% or less,
in which, on the basis of a distribution in the width direction of the steel sheet, a ratio of a standard deviation of the area fraction of the as-quenched martensite to the area fraction of the as-quenched martensite is 10% or less, and
in which, on the basis of a distribution in the width direction of the steel sheet, a ratio of a standard deviation of the area fraction of the retained austenite to the area fraction of the retained austenite is 10% or less.

[2] The steel sheet according to item [1], in which the chemical composition further contains, by mass %, at least one selected from:

Ti: 0.2% or less,
Nb: 0.2% or less,
V: 0.5% or less,
Cu: 0.5% or less,
Ni: 0.5% or less,
Cr: 1.0% or less, and
B: 0.0050% or less.

[3] The steel sheet according to item [1] or [2], in which the chemical composition further contains, by mass %, at least one selected from:
Mo: 1.0% or less,
Sb: 0.050% or less,
REM: 0.050% or less,
Mg: 0.050% or less, and
Ca: 0.050% or less.

[4] The steel sheet according to any one of items [1] to [3], the steel sheet having a coating layer on a surface thereof.

[5] A member manufactured by performing at least one of forming and welding on the steel sheet according to any one of items [1] to [4].

[6] A method for manufacturing a steel sheet, the method including:
a hot rolling step of heating a steel slab having the chemical composition according to any one of items [1] to [3] to a temperature of 1100° C. or higher and 1300° C. or lower, performing hot rolling on the heated steel slab with a finish rolling delivery temperature of 800° C. or higher and 1000° C. or lower, and coiling the hot rolled steel sheet at a coiling temperature of 400° C. or higher and 700° C. or lower to obtain a hot rolled steel sheet,
a pickling treatment step of performing a pickling treatment on the hot rolled steel sheet,
a cold rolling step of performing cold rolling on the pickled hot rolled steel sheet with a rolling reduction ratio of 40% or more to obtain a cold rolled steel sheet, and
an annealing step of heating the cold rolled steel sheet to a temperature range of 780° C. or higher and 860° C. or lower, cooling to a cooling stop temperature of 300° C. or higher and 540° C. or lower at an average cooling rate of 6° C./s or higher and 25° C./s or lower in a temperature range from 750° C. to 600° C., heating to an over-aging temperature which is equal to or higher than (the cooling stop temperature+10° C.) and which is 350° C. or higher and 550° C. or lower at an average heating rate of 5.0° C./s or lower, and holding at the over-aging temperature for 480 seconds or more.

[7] The method for manufacturing a steel sheet according to item [6], the method further including a coating step of performing a coating treatment on a surface of the annealed steel sheet.

[8] A method for manufacturing a member, the method including a step of performing at least one of forming and welding on the steel sheet manufactured by using the method for manufacturing a steel sheet according to item [6] or [7].

[9] A method for manufacturing a member, the method including a step of performing at least one of forming and welding on the steel sheet according to any one of items [1] to [4].

According to aspects of the present invention, it is possible to provide a steel sheet having a tensile strength of 590 MPa or higher, excellent formability, and excellent stability of mechanical properties, a member, and methods for manufacturing the steel sheet and the member. By using the steel sheet according to aspects of the present invention for automotive parts, it is possible to realize a higher level of weight reduction of the automotive parts while inhibiting an increase in cost due to material defects.

DETAILED DESCRIPTION OF EMBODIMENTS OF THE INVENTION

Hereafter, embodiments of the present invention will be described specifically. First, the chemical composition of steel according to aspects of the present invention will be described.

The steel sheet according to aspects of the present invention has a chemical composition containing, by mass %, C: 0.05% or more and 0.25% or less, Si: 0.80% or more and 2.20% or less, Mn: 0.80% or more and 3.0% or less, P: 0.05% or less, S: 0.005% or less, Al: 0.70% or less, and N: 0.0060% or less. Hereafter, each of the constituents will be described. In the description below, "%" used when describing the content of each of the constituents denotes "mass %".

C: 0.05% or More and 0.25% or Less

C contributes to increasing the strength of a steel sheet and is effective for improving ductility by improving the stability of retained austenite. To achieve the desired properties according to aspects of the present invention, it is necessary that the C content be 0.05% or more. It is preferable that the C content be 0.09% or more. On the other hand, in the case where the C content is more than 0.25%, since hardenability becomes excessively high, it is not possible to promote ferrite transformation in a cooling process for an annealing treatment, which results in a negative effect on the stability of mechanical properties. In addition, there is also a decrease in ductility or hole expansion ratio. Therefore, the C content is set to be 0.25% or less. It is preferable that the C content be 0.24% or less.

Si: 0.80% or More and 2.20% or Less

Si is an element which increases the elongation of a steel sheet and which is effective for forming retained austenite by inhibiting the precipitation of cementite. To achieve the desired formability and the desired amount of retained austenite, the Si content is set to be 0.80% or more or preferably 0.90% or more. On the other hand, in the case where the Si content is more than 2.20%, since there is a deterioration in chemical convertibility, the steel sheet is not suitable for automobile members. Therefore, the Si content is set to be 2.20% or less or preferably 2.10% or less.

Mn: 0.80% or More and 3.0% or Less

Mn is an element which stabilizes austenite, and it is necessary that the Mn content be 0.80% or more to achieve the desired ferrite area fraction and retained austenite area fraction. It is preferable that the Mn content be 1.2% or more. On the other hand, in the case where the Mn content is excessively high, since hardenability becomes excessively high, it is not possible to form a microstructure in such a manner that a microstructure is formed of ferrite and pearlite throughout the whole steel sheet at a coiling temperature after hot rolling has been performed, which results in a bainite microstructure being partially formed. In addition, since ferrite transformation is inhibited when cooling is performed in an annealing process, there is a significant deterioration in the uniformity of a microstructure after annealing has been performed, which results in the target stability of mechanical properties according to aspects of the present invention not being achieved. Therefore, the Mn content is set to be 3.0% or less or preferably 2.9% or less.

P: 0.05% or Less

Since P is a harmful element which causes low-temperature embrittlement and a decrease in weldability, it is preferable that the P content be as low as possible. In accordance with aspects of the present invention, it is acceptable that the P content be up to 0.05%. It is preferable that the P content be 0.02% or less. It is more preferable that the P content be 0.01% or less for use under more severe welding conditions. Although there is no particular lower limit of the P content, it is preferable that the P content be 0.002% or more, because the industrially applicable lower limit is currently 0.002%.

S: 0.005% or Less

Since S forms sulfides having a large grain size in steel, and since such sulfides are elongated to form wedge-shaped inclusions when hot rolling is performed, there is a negative effect on weldability. Therefore, since S is also a harmful element, it is preferable that the S content be as low as possible. In accordance with aspects of the present invention, since it is acceptable that the S content be up to 0.005%, the S content is set to be 0.005% or less. It is preferable that the S content be 0.003% or less. It is more preferable that the S content be 0.001% or less for use under more severe welding conditions. Although there is no particular lower limit of the S content, it is preferable that the S content be 0.0002% or more, because the industrially applicable lower limit is currently 0.0002%.

Al: 0.70% or Less

Since Al is an element which causes a decrease in castability, the Al content is set to be 0.70% or less or preferably 0.30% or less from the viewpoint of productivity. Although there is no particular limitation on the lower limit of the Al content, it is preferable that the Al content be 0.001% or more or more preferably 0.005% or more in the case where Al is added as a deoxidizing agent in a steelmaking stage. In addition, the preferable range of the Al content is also dependent on the relationship with the Si content. Al is, like Si, effective for improving the stability of retained austenite by inhibiting the precipitation of cementite. It is preferable that the total content of Si and Al be 0.90% or more, and it is more preferable that the total content of Si and Al be 1.10% or more from the viewpoint of inhibiting a variation in mechanical properties.

N: 0.0060% or Less

N is a harmful element which has a negative effect on formability, because N causes unexpected cracking by causing a deterioration in ordinary temperature aging resistance. Therefore, it is preferable that the N content be as low as possible. In accordance with aspects of the present invention, the N content is set to be 0.0060% or less. It is preferable that the N content be 0.0050% or less. Although it is preferable that the N content be as low as possible, it is preferable that the N content be 0.0003% or more, because the industrially applicable lower limit is currently 0.0003%.

The constituents described above are the basic constituents of the steel sheet used in accordance with aspects of the present invention. The steel sheet used in accordance with aspects of the present invention has a chemical composition containing the basic constituents described above and a balance, which is different from the constituents described above, being Fe (iron) and incidental impurities. Here, it is preferable that the steel sheet according to aspects of the present invention have a chemical composition containing the constituents described above and a balance being Fe and incidental impurities. In addition to the basic constituents described above, optional constituents described below may be contained in the steel sheet according to aspects of the present invention in the respective ranges described below.

Here, in the case where the optional constituents described below are contained in amounts equal to or less than the respective upper limits described below, it is possible to realize the effects according to aspects of the present invention. Therefore, there is no particular lower limit. In addition, in the case where the optional elements described below are contained in amounts less than the preferable lower limits described below, these elements are regarded as being contained as incidental impurities.

At Least One Selected from Ti: 0.2% or Less, Nb: 0.2% or Less, V: 0.5% or Less, Cu: 0.5% or Less, Ni: 0.5% or Less, Cr: 1.0% or Less, and B: 0.0050% or Less In the case where these elements are contained, since there is a decrease in grain size, damage is inhibited from occurring in a punched end surface, which results in expectation of an effect of improving stretch flange formability. On the other hand, in the case where the content of one of the constituents described above is excessively high, since hardenability becomes excessively high due to the formation of inclusions, it is not possible to form the desired steel microstructure, which results in a deterioration in the stability of mechanical properties. Therefore, in the case where these elements are contained, the contents of these elements are set to be equal to or lower than the respective upper limits described above. In the case where these elements are contained in amounts equal to or less than the respective upper limits described above, it is possible to realize the effects according to aspects of the present invention. Therefore, there is no particular limitation on the lower limits of the contents of these elements. From the viewpoint of realizing the above-described effect of improving stretch flange formability to a higher level, it is preferable that at least one selected from Ti: 0.001% or more, Nb: 0.001% or more, V: 0.001% or more, Cu: 0.001% or more, Ni: 0.01% or more, Cr: 0.001% or more, and B: 0.0002% or more be contained. In addition, it is preferable that the Ti content be 0.1% or less or more preferably 0.05% or less. In addition, it is preferable that the Nb content be 0.1% or less or more preferably 0.05% or less. In addition, it is preferable that the Cr content be 0.1% or less or more preferably 0.05% or less.

At Least One Selected from Mo: 1.0% or Less, Sb: 0.050% or Less, REM: 0.050% or Less, Mg: 0.050% or Less, and Ca: 0.050% or Less These elements are elements which are used for strength adjustment, inclusion control, and the like, and there is no decrease in the effects according to aspects of the present invention in the case where these elements are contained in amounts equal to or less than the respective upper limits described above. In the case where these elements are contained in amounts equal to or less than the respective upper limits described above, it is possible to realize the effects according to aspects of the present invention. Therefore, there is no particular limitation on the lower limits of the contents of these elements. From the viewpoint of realizing the above-described effects of strength adjustment, inclusion control, and the like to a higher level, it is preferable that at least one selected from Mo: 0.001% or more, Sb: 0.001% or more, REM: 0.0002% or more, Mg: 0.0002% or more, and Ca: 0.0002% or more be contained. In addition, it is preferable that the Mo content be 0.2% or less or more preferably 0.1% or less.

In the case where the steel sheet has the chemical composition described above, since it is possible to promote ferrite transformation when cooling is performed under the manufacturing conditions described below, it is possible to achieve an improvement in the uniformity of a microstructure.

Hereafter, the steel microstructure of the steel sheet according to aspects of the present invention will be described. The steel microstructure of the steel sheet according to aspects of the present invention includes, in terms of area fraction, ferrite and bainitic ferrite in a total amount of 60% or more and 90% or less, as-quenched martensite in an amount of 5% or more and 20% or less, retained austenite in an amount of 4% or more and 20% or less, and a balance being in an amount of 5% or less. In addition, the average grain size of ferrite and/or bainitic ferrite is 7.0 µm or less. In addition, on the basis of a distribution in the width direction of the steel sheet, the ratio of the standard deviation of the grain size of ferrite and/or bainitic ferrite to the average grain size of ferrite and/or bainitic ferrite is 10% or less. In addition, on the basis of a distribution in the width direction of the steel sheet, the ratio of the standard deviation of the area fraction of as-quenched martensite to the area fraction of as-quenched martensite is 10% or less. In addition, on the basis of a distribution in the width direction of the steel sheet, the ratio of the standard deviation of the area fraction of retained austenite to the area fraction of retained austenite is 10% or less.

Total Area Fraction of Ferrite and Bainitic Ferrite: 60% or More and 90% or Less Since a ferrite phase is soft, it is not possible to achieve the desired strength of the steel sheet in the case where the total area fraction of ferrite and bainitic ferrite is more than 90%. Therefore, the total area fraction of ferrite and bainitic ferrite is set to be 90% or less or preferably 85% or less. On the other hand, in the case where the total area fraction is less than 60%, since the partitioning of C or Mn does not progress sufficiently, it is not possible to achieve the desired uniformity of a microstructure in the width direction of the steel sheet. Therefore, the total area fraction is set to be 60% or more or preferably 65% or more.

Area Fraction of as-Quenched Martensite: 5% or More and 20% or Less

As-quenched martensite, which is significantly hard, causes significant damage to occur in a punched end surface when punching is performed. To achieve the formability required in accordance with aspects of the present invention, it is necessary that the area fraction of as-quenched martensite be 20% or less or preferably 18% or less. On the other hand, in the case where the area fraction of as-quenched martensite is less than 5%, it is not possible to achieve the desired strength. Therefore, the area fraction of as-quenched martensite is set to be 5% or more or preferably 7% or more.

Area Fraction of Retained Austenite: 4% or More and 20% or Less

Retained austenite contributes to improving formability by improving ductility. To achieve the properties required in accordance with aspects of the present invention, the area fraction of retained austenite is set to be 4% or more or preferably 8% or more. On the other hand, in the case where the area fraction of retained austenite is more than 20%, since there is an increase in the area of the interface with a soft ferrite phase, and since retained austenite transforms into a hard martensite microstructure when punching is performed in a hole expansion test, which is performed to evaluate formability in accordance with aspects of the present invention, there is a deterioration in stretch flange formability due to a difference in hardness occurring between the phases, which results in the formability desired in accordance with aspects of the present invention not being achieved. Therefore, the area fraction of retained austenite is set to be 20% or less or preferably 17% or less.

Here, the microstructure of the steel sheet according to aspects of the present invention may include lower bainite, pearlite, tempered martensite, or the like as a remaining microstructure which is different from the microstructures described above. The remaining microstructure may be included as far as there is no decrease in the effects according to aspects of the present invention, and it is acceptable that the area fraction of the remaining microstructure described above be 5% or less in accordance with aspects of the present invention. In the case where the area fraction of the remaining microstructure is more than 5%, it is not possible to achieve the formability desired in accordance with aspects of the present invention. In addition, it is preferable that the area fraction be 4% or less.

Average Grain Size of Ferrite and/or Bainitic Ferrite: 7.0 μm or Less

Ferrite is a soft phase and is a microstructure which has an effect on ductility. In accordance with aspects of the present invention, as a result of promoting ferrite transformation, there is an improvement in the uniformity of ductility in the width direction of the steel sheet while there is a decreased variation in ferrite grain size throughout the width of the steel sheet, which results in an improvement in the stability of mechanical properties. Here, in the case where the average grain size of ferrite and/or bainitic ferrite is more than 7.0 μm, since retained austenite or as-quenched martensite does not exist uniformly, there is a negative effect on hole expansion ratio. Therefore, the average grain size is set to be 7.0 μm or less. In addition, although there is no particular limitation on the lower limit of the average grain size, it is preferable that the average grain size be 3.0 μm or more. Here, the average grain size of ferrite and/or bainitic ferrite is measured by using the method described in EXAMPLES.

Ratio of the Standard Deviation of the Grain Size of Ferrite and/or Bainitic Ferrite to the Average Grain Size of Ferrite and/or Bainitic Ferrite on the Basis of a Distribution in the Width Direction of the Steel Sheet: 10% or Less In the case where, on the basis of a distribution in the width direction of the steel sheet, the ratio of the standard deviation of the grain size of ferrite and/or bainitic ferrite to the average grain size of ferrite and/or bainitic ferrite is more than 10%, there is an increased variation in total elongation throughout the width of the steel sheet. In addition, in the case where this ratio is more than 10%, there is an increased variation in tensile strength in the width direction of the steel sheet. Therefore, on the basis of a distribution in the width direction of the steel sheet, the ratio is set to be 10% or less or preferably 8% or less.

Here, the expression "ferrite and/or bainitic ferrite" in accordance with aspects of the present invention denotes both ferrite and bainitic ferrite in the case where both ferrite and bainitic ferrite exist, or, in the case where only one of ferrite and bainitic ferrite exists, only the existing phase.

In the case of the measuring method used in accordance with aspects of the present invention, since it is difficult to distinguish between ferrite and bainitic ferrite in a steel microstructure, the average grain size of a group consisting of ferrite grains and bainitic ferrite grains is defined as the average grain size of ferrite and/or bainitic ferrite in accordance with aspects of the present invention. In addition, the standard deviation of the grain size of a group consisting of ferrite grains and bainitic ferrite grains is defined as the standard deviation of the grain size of ferrite and/or bainitic ferrite in accordance with aspects of the present invention.

Ratio of the Standard Deviation of the Area Fraction of as-Quenched Martensite to the Area Fraction of as-Quenched Martensite on the Basis of a Distribution in the Width Direction of the Steel Sheet: 10% or Less In the case where, on the basis of a distribution in the width direction of the steel sheet, the ratio of the standard deviation in the width direction of the steel sheet of the area fraction of as-quenched martensite to the area fraction of as-quenched martensite is more than 10%, there is a variation in tensile strength and hole expansion ratio in the width direction of the steel sheet. In addition, in the case where this ratio is more than 10%, there is a variation in total elongation in the width direction of steel sheet. Therefore, the ratio is set to be 10% or less or preferably 8% or less.

Ratio of the Standard Deviation of the Area Fraction of Retained Austenite to the Area Fraction of Retained Austenite on the Basis of a Distribution in the Width Direction of the Steel Sheet: 10% or Less In the case where, on the basis of a distribution in the width direction of the steel sheet, the ratio of the standard deviation of the area fraction of retained austenite to the area fraction of retained austenite is more than 10%, there is an increased variation in total elongation throughout the width of the steel sheet. Therefore, the ratio is set to be 10% or less or preferably 8% or less.

The area fraction of a steel microstructure is measured in the following manner.

An observation specimen is taken from a steel sheet so that the observation surface is a cross section parallel to the rolling direction, and is etched in 1 vol % nital so as to expose a cross section in the thickness direction, and a microstructure image is then taken at a ¼t position, which is located at ¼ of the thickness, by using a scanning electron microscope (SEM) at a magnification of 2000 times. Such microstructure observation is performed in a region having an area of 3000 μm$^2$ or more at respective ½w (central position in the width direction), ⅛w, ⅜w, ⅝w, and ⅞w positions. The following items (i) and (ii) are each measured. Here, "t" denotes a thickness, and "w" denotes a width.

(i) Ferrite and Bainitic Ferrite

Ferrite and bainitic ferrite are both identified as grey regions in a SEM image. Therefore, ferrite and bainitic ferrite are regarded as an identical microstructure in the SEM image, and the total area fraction of ferrite and bainitic ferrite is measured by using a point counting method. The total area fraction of ferrite and bainitic ferrite is measured at respective ½w (central position in the width direction), ⅛w, ⅜w, ⅝w, and ⅞w positions. The average of the values measured at the five positions is defined as the total area fraction of ferrite and bainitic ferrite in accordance with aspects of the present invention.

The average grain size of ferrite and/or bainitic ferrite is calculated by measuring an average intercept length on the basis of grain boundaries with other microstructures by using an intercept method and by converting the obtained average intercept length to an equivalent circular diameter. The average grain size is measured at respective ½w (central position in the width direction), ⅛w, ⅜w, ⅝w, and ⅞w positions. The average of the values measured at the five positions is defined as the average grain size (hereinafter, referred to as "average grain size F") of ferrite and/or bainitic ferrite on the basis of a distribution in the width direction of the steel sheet.

The standard deviation (hereinafter, referred to as "standard deviation F") of the grain size of ferrite and/or bainitic ferrite on the basis of a distribution in the width direction of the steel sheet is calculated as the standard deviation of a population consisting of the five values of average grain size measured at the respective ½w (central position in the width direction), ⅛w, ⅜w, ⅝w, and ⅞w positions described above.

In addition, "the ratio (%) of the standard deviation of the grain size of ferrite and/or bainitic ferrite to the average grain size of ferrite and/or bainitic ferrite on the basis of a distribution in the width direction of the steel sheet" is calculated by dividing the standard deviation F by the average grain size F, that is, by using the formula "((standard deviation F)/(average grain size F))×100(%)".

(ii) As-Quenched Martensite and Retained Austenite

Since as-quenched martensite and retained austenite are both identified as white regions in a SEM image, it is not possible to distinguish between as-quenched martensite and retained austenite. Therefore, the area fraction of retained austenite is separately measured by using the method described below. In addition, the area fraction of as-quenched martensite is measured by subtracting the area fraction of the retained austenite, which is measured by using the method described above, from the total area fraction of as-quenched martensite and retained austenite, which is measured by using a point counting method in the SEM image. The area fraction of as-quenched martensite is measured at respective ½w (central position in the width direction), ⅛w, ⅜w, ⅝w, and ⅞w positions. Specifically, the area fraction of as-quenched martensite at a ½w position (central position in the width direction) is measured by subtracting the area fraction of retained austenite measured at the ½w position (central position in the width direction) from the total area fraction of as-quenched martensite and retained austenite measured at the ½w position (central position in the width direction). In a similar manner, the area fraction of as-quenched martensite is measured at respective ⅛w, ⅜w, ⅝w, and ⅞w positions. In addition, the average of the values measured at the five positions is defined as the area fraction of as-quenched martensite (hereinafter, referred to as "area fraction M") in accordance with aspects of the present invention.

In addition, the standard deviation (hereinafter, referred to as "standard deviation M") of the area fraction of as-quenched martensite on the basis of a distribution in the width direction of the steel sheet is calculated as the standard deviation of a population consisting of the five values of the area fraction of as-quenched martensite measured at respective ½w (central position in the width direction), ⅛w, ⅜w, ⅝w, and ⅞w positions.

In addition, "the ratio (%) of the standard deviation of the area fraction of as-quenched martensite to the area fraction of as-quenched martensite on the basis of a distribution in the width direction of the steel sheet" is calculated by dividing the standard deviation M by the area fraction M, that is, by using the formula "((standard deviation M)/(area fraction M))×100(%)".

In addition, regarding the area fraction of retained austenite, the volume fraction of retained austenite is measured by polishing the surface of a steel sheet in the thickness direction to the position located at ¼ of the thickness, by further performing chemical polishing on the polished surface to remove a thickness of 0.1 mm, by measuring, by means of an X-ray diffractometer with the Kα-ray of Mo, the integrated reflection intensities from the (200)-plane, (220)-plane, and (311)-plane of fcc-iron (austenite) and from the (200)-plane, (211)-plane, and (220)-plane of bcc-iron (ferrite), and by calculating the volume fraction from the ratio of the integrated reflection intensity from the planes of fcc-iron (austenite) to the integrated reflection intensity from the planes of bcc-iron (ferrite). In accordance with aspects of the present invention, the volume fraction of retained austenite is regarded as the area fraction of retained austenite. Such measurement is performed at respective ½w (central position in the width direction), ⅛w, ⅜w, ⅝w, and ⅞w positions. In addition, the average of the values measured at the five positions is defined as the area fraction of retained austenite (hereinafter, referred to as "area fraction R") in accordance with aspects of the present invention.

In addition, the standard deviation (hereinafter, referred to as "standard deviation R") of the area fraction of retained austenite on the basis of a distribution in the width direction of the steel sheet is calculated as the standard deviation of a population consisting of the five values of the area fraction of retained austenite measured at respective ½w (central position in the width direction), ⅛w, ⅜w, ⅝w, and ⅞w positions.

In addition, "the ratio (%) of the standard deviation of the area fraction of retained austenite to the area fraction of retained austenite on the basis of a distribution in the width direction of the steel sheet" is calculated by dividing the standard deviation R by the area fraction R, that is, by using the formula "((standard deviation R)/(area fraction R))×100 (%)".

The steel sheet according to aspects of the present invention has a tensile strength (TS) of 590 MPa or higher. The expression "high strength" in accordance with aspects of the present invention denotes a tensile strength of 590 MPa or higher.

Here, tensile strength can be obtained by performing a tensile test described below.

First, a JIS No. 5 tensile test specimen whose tensile direction is perpendicular to the rolling direction is taken from each of ½w (central position in the width direction), ⅛w, ⅜w, ⅝w, and ⅞w positions of a steel sheet. A tensile test is performed on each test specimen in accordance with the prescription in JIS Z 2241 (2011). The cross-head speed in the tensile test is set to be 10 mm/min. Here, two test specimens are taken from each of the measurement positions, measurement is performed twice for each of the measurement positions, and the average of the two measured values is calculated as the measured value for each of the measurement positions.

By performing a tensile test as described above, tensile strength (TS) is measured at respective ½w (central position in the width direction), ⅛w, ⅜w, ⅝w, and ⅞w positions. The average of the values measured at the five positions is defined as the tensile strength (hereinafter, referred to as "measured value TS") in accordance with aspects of the present invention.

The steel sheet according to aspects of the present invention is excellent in terms of formability. The expression "excellent in terms of formability" in accordance with aspects of the present invention denotes a case where tensile strength (TS)×total elongation (El)≥24000 MPa·% or more and the hole expansion ratio λ (%) satisfies item (A1) or (A2) below.

(A1) the hole expansion ratio λ is 60% or more in the case where the tensile strength is 590 MPa or more and less than 780 MPa (A2) the hole expansion ratio λ is 30% or more in the case where the tensile strength is 780 MPa or more The steel sheet according to aspects of the present invention is excellent in terms of the stability of mechanical properties. The expression "excellent in terms of the stability of mechanical properties" in accordance with aspects of the present invention denotes a case where all of items (B1), (B2), and (B3) below are satisfied.

(B1) on the basis of a distribution in the width direction of the steel sheet, the ratio of the standard deviation of the tensile strength to the tensile strength is 3% or less (B2) on the basis of a distribution in the width direction of the steel sheet, the ratio of the standard deviation of the total elongation to the total elongation is 2% or less (B3) on the basis of a distribution in the width direction of the steel sheet, the ratio of the standard deviation of the hole expansion ratio to the hole expansion ratio is 10% or less Here, the standard deviation (hereinafter, referred to as "standard deviation TS") of tensile strength on the basis of a distribution in the width direction of the steel sheet is calculated as the standard deviation of a population consisting of the five values of tensile strength (TS) measured at respective ½w (central position in the width direction), ⅛w, ⅜w, ⅝w, and ⅞w positions.

In addition, in accordance with aspects of the present invention, "the ratio (%) of the standard deviation of tensile strength to tensile strength on the basis of a distribution in the width direction of the steel sheet" is calculated by dividing the standard deviation TS by the measured value TS, that is, by using the formula "((standard deviation TS)/(measured value TS))×100(%)".

In addition, by performing a tensile test as described above, total elongation (El) is measured at respective ½w (central position in the width direction), ⅛w, ⅜w, ⅝w, and ⅞w positions. The average of the values measured at the five positions is defined as the total elongation (hereinafter, referred to as "measured value El") in accordance with aspects of the present invention.

In addition, the standard deviation (hereinafter, referred to as "standard deviation El") of total elongation on the basis of a distribution in the width direction of the steel sheet is calculated as the standard deviation of a population consisting of the five values of total elongation (El) measured at respective ½w (central position in the width direction), ⅛w, ⅜w, ⅝w, and ⅞w positions.

In addition, in accordance with aspects of the present invention, "the ratio (%) of the standard deviation of total elongation to total elongation on the basis of a distribution in the width direction of the steel sheet" is calculated by dividing the standard deviation El by the measured value El, that is, by using the formula "((standard deviation El)/(measured value El))×100(%)".

In addition, regarding a hole expansion ratio, a test specimen having a size of 100 mm×100 mm is first taken from each of ½w (central position in the width direction), ⅛w, ⅜w, ⅝w, and ⅞w positions of a steel sheet, a hole expansion test is performed on each test specimen in accordance with the prescription in JFS T 1001 (The Japan Iron and Steel Federation Standard) in such a manner that the test is performed three times for each of the positions from which the test specimens are taken, and the average of the three measured values is defined as a hole expansion ratio λ (%) for each of the positions from which the test specimens are taken. The average of the values measured at the five positions is defined as the hole expansion ratio λ (%) (hereinafter, referred to as "measured value λ (%)") in accordance with aspects of the present invention.

In addition, the standard deviation (hereinafter, referred to as "standard deviation λ") of a hole expansion ratio λ on the basis of a distribution in the width direction of the steel sheet is calculated as the standard deviation of a population consisting of the five values of hole expansion ratio λ (%) measured at respective ½w (central position in the width direction), ⅛w, ⅜w, ⅝w, and ⅞w positions.

In addition, in accordance with aspects of the present invention, "the ratio (%) of the standard deviation of a hole expansion ratio to a hole expansion ratio on the basis of a distribution in the width direction of the steel sheet" is calculated by dividing the standard deviation λ by the measured value λ, that is, by using the formula "((standard deviation λ)/(measured value λ))×100(%)".

It is preferable that the thickness of the steel sheet according to aspects of the present invention be 0.2 mm or more and 3.2 mm or less from the viewpoint of effectively realizing the effects according to aspects of the present invention.

The steel sheet according to aspects of the present invention may have a coating layer on the surface thereof. There is no particular limitation on the kind of the coating layer, and any one of a Zn coating layer and a coating layer formed of a metal other than Zn may be used. In addition, the coating layer may contain constituents other than a main constituent such as Zn or the like.

Hereafter, one embodiment of the method for manufacturing the steel sheet according to aspects of the present invention will be described in detail. Here, the below-described temperature used when a steel slab (steel material), a steel sheet, or the like is heated or cooled denotes the surface temperature of a steel slab (steel material), a steel sheet, or the like, unless otherwise noted.

One embodiment of the method for manufacturing the steel sheet according to aspects of the present invention includes a hot rolling step of heating a steel slab having the chemical composition described above to a temperature of 1100° C. or higher and 1300° C. or lower, performing hot rolling on the heated steel slab with a finish rolling delivery temperature of 800° C. or higher and 1000° C. or lower, and coiling the hot rolled steel sheet at a coiling temperature of 400° C. or higher and 700° C. or lower to obtain a hot rolled steel sheet, a pickling treatment step of performing a pickling treatment on the hot rolled steel sheet, a cold rolling step of performing cold rolling on the pickled hot rolled steel sheet with a rolling reduction ratio of 40% or more to obtain a cold rolled steel sheet, and an annealing step of heating the cold rolled steel sheet to a temperature range of 780° C. or higher and 860° C. or lower, cooling the heated steel sheet to a cooling stop temperature of 300° C. or higher and 540° C. or lower at an average cooling rate of 6° C./s or higher and 25° C./s or lower in a temperature range from 750° C. to 600° C., heating the cooled steel sheet to an over-aging temperature which is equal to or higher than (the cooling stop temperature+10° C.) and which is 350° C. or higher and 550° C. or lower at an average heating rate of 5.0° C./s or lower, and holding the heated steel sheet at the over-aging temperature for 480 seconds or more. Hereafter, each of the steps will be described.

The hot rolling step is a step of heating a steel slab having the chemical composition described above to a temperature of 1100° C. or higher and 1300° C. or lower, performing hot rolling on the heated steel slab with a finish rolling delivery temperature of 800° C. or higher and 1000° C. or lower, and coiling the hot rolled steel sheet at a coiling temperature of 400° C. or higher and 700° C. or lower to obtain a hot rolled steel sheet.

There is no particular limitation on the method used for preparing molten steel to manufacture the steel slab (steel material) described above, and a known method for preparing molten steel such as one utilizing a converter, an electric furnace, or the like may be used. In addition, secondary refining may be performed by using a vacuum degassing furnace. Subsequently, it is preferable that the molten steel be made into a steel slab by using a continuous casting method from the viewpoint of productivity and product quality. In addition, the molten steel may be made into a steel slab by using a known method such as an ingot casting-blooming method, a thin-slab continuous casting method, or the like.

Heating to a Temperature of 1100° C. or Higher and 1300° C. or Lower

It is necessary that the steel slab be heated to a temperature of 1100° C. or higher. This is for the purpose of achieving the finish rolling delivery temperature described below and improving the uniformity of the microstructure of a steel sheet after annealing has been performed as a result of allowing reverse transformation into austenite to appropriately progress to uniformize the microstructure of the slab. On the other hand, in the case where the slab is heated to a temperature of higher than 1300° C., since melting occurs in the slab, it is not possible to perform intended hot rolling. Therefore, heating is performed to a temperature of 1100° C. or higher and 1300° C. or lower.

Finish Rolling Delivery Temperature: 800° C. or Higher and 1000° C. or Lower

In the case where the finish rolling delivery temperature is lower than 800° C., since there is an increase in rolling load, there is an operational problem. In addition, in the case where the finish rolling delivery temperature is lower than 800° C., since ferrite transformation occurs in a portion of a microstructure, there is a negative effect on the uniformity of a microstructure. Therefore, the finish rolling delivery temperature is set to be 800° C. or higher. On the other hand, in the case where the finish rolling delivery temperature is higher than 1000° C., since there is a significant increase in the grain size of a microstructure, there is a decrease in the strength of a steel sheet, and there is a negative effect on the uniformity of a microstructure. Therefore, the finish rolling delivery temperature is set to be 1000° C. or lower.

Coiling Temperature: 400° C. or Higher and 700° C. or Lower

The coiling temperature is one of the important factors in accordance with aspects of the present invention. In accordance with aspects of the present invention, the stability of mechanical properties is achieved by making the best use of the uniformity of a microstructure. In the case where the coiling temperature is 400° C. or higher and 700° C. or lower, since pearlite transformation is promoted in a hot rolling line, a microstructure after hot rolling has been performed consists of uniformly dispersed pearlite and ferrite. In the case where the coiling temperature is lower than 400° C., a bainite microstructure is mixed in a portion of a microstructure, and a non-uniform microstructure is formed in a subsequent annealing process. In addition, since there is a local variation in the thickness of a steel sheet, there is a deterioration in material properties. On the other hand, in the case where the coiling temperature is higher than 700° C., there is an increase in the grain size of a ferrite microstructure and a pearlite microstructure. Since a pearlite microstructure becomes a nucleation site of austenite which is formed through reverse transformation in an annealing process, there is an increase in the average grain size of ferrite and/or bainitic ferrite in the case of a coiling temperature in such a range, and there is a deterioration in formability. Therefore, it is necessary that coiling be performed at a temperature of 400° C. or higher and 700° C. or lower. Here, it is preferable that the coiling temperature be 570° C. or lower from the viewpoint of improving the strength of a steel sheet.

The pickling treatment step is a step of performing a pickling treatment on the hot rolled steel sheet. There is no particular limitation on the method used for pickling, and a known manufacturing method may be used.

The cold rolling step is a step of performing cold rolling on the pickled hot rolled steel sheet with a rolling reduction ratio of 40% or more to obtain a cold rolled steel sheet.

Performing Cold Rolling with a Rolling Reduction Ratio of 40% or More

In the case where the rolling reduction ratio of cold rolling is less than 40%, since it is not possible to sufficiently form a cold rolled microstructure, a non-uniform microstructure is formed after an annealing step. Therefore, it is necessary that cold rolling be performed with a rolling reduction ratio of 40% or more or preferably 50% or more. Although there is no upper limit of rolling reduction ratio, the rolling reduction ratio is set to be substantially 85% or less from the viewpoint of cold rolling load.

The annealing step is a step of heating the cold rolled steel sheet to a temperature range of 780° C. or higher and 860° C. or lower after the cold rolling step described above, cooling the heated steel sheet to a cooling stop temperature of 300° C. or higher and 540° C. or lower at an average cooling rate of 6° C./s or higher and 25° C./s or lower in a temperature range from 750° C. to 600° C., heating the cooled steel sheet to an over-aging temperature which is equal to or higher than (the cooling stop temperature+10° C.) and which is 350° C. or higher and 550° C. or lower at an average heating rate of 5.0° C./s or lower, and holding the heated steel sheet at the over-aging temperature for 480 seconds or more. Here, it is preferable that the annealing step be performed by using a continuous annealing line.

Heating to a Temperature Range of 780° C. or Higher and 860° C. or Lower

By performing heating to a temperature range of 780° C. or higher and 860° C. or lower (heating temperature), since it is possible to control the area fractions of ferrite and austenite and to promote carbon partitioning when dual-phase annealing is performed, it is possible to control tensile strength to be within the desired range. In the case where the heating temperature is lower than 780° C., since there is a decrease in the amount of austenite formed through reverse transformation, there is an excessive increase in the concentrations of C and Mn in austenite formed through reverse transformation. Consequently, since there is an excessive increase in the amount of hard as-quenched martensite microstructure or retained austenite microstructure formed, there is a significant deterioration in formability. Therefore, it is necessary that heating be performed to a temperature of 780° C. or higher so that reverse transformation into austenite progresses sufficiently. On the other hand, in the case where the heating temperature is higher than 860° C., since there is an increase in the grain size of austenite formed through reverse transformation, there is an increase in the grain size of ferrite and/or bainitic ferrite, which results in satisfactory tensile strength not being achieved. Therefore, the heating temperature is set to be 860° C. or lower. Although there is no particular limitation on the holding time in the temperature range of 780° C. or higher and 860° C. or lower, it is preferable that the holding time be 10 seconds or more and 900 seconds or less.

Cooling the Heated Steel Sheet to a Cooling Stop Temperature of 300° C. or Higher and 540° C. or Lower at an Average Cooling Rate of 6° C./s or Higher and 25° C./s or Lower in a Temperature Range from 750° C. to 600° C.

After heating has been performed, it is necessary to achieve the uniformity of a microstructure by promoting ferrite transformation. In the case where the average cooling rate in a temperature range from 750° C. to 600° C. is higher than 25° C./s, since ferrite transformation does not progress sufficiently, it is not possible to achieve the uniformity of a microstructure. Therefore, the average cooling rate is set to be 25° C./s or lower. On the other hand, in the case where the average cooling rate is lower than 6° C./s, since ferrite transformation excessively progresses, and since a pearlite microstructure is also partially formed, it is difficult to achieve satisfactory strength. Therefore, the average cooling rate is set to be 6° C./s or higher. In addition, in the case where the cooling stop temperature is lower than 300° C., since martensite transformation occurs in a portion of a microstructure, there is a negative effect on the uniformity of a microstructure, which makes it difficult to achieve the uniformity of stretch flange formability in the longitudinal and width directions of the steel sheet. Moreover, in the case where the cooling stop temperature is higher than 540° C., since the over-aging temperature in the next step is high, it is not possible to achieve the desired ductility due to the decomposition of non-transformed austenite. Therefore, the cooling stop temperature is set to be 300° C. or higher and 540° C. or lower.

Performing Heating to an Over-Aging Temperature which is Equal to or Higher than (the Cooling Stop Temperature+10° C.) and which is 350° C. or Higher and 550° C. or Lower at an Average Heating Rate of 5.0° C./s or Lower, Followed by Holding at the Over-Aging Temperature for 480 Seconds or More By allowing austenite, which is left non-transformed as a result of not transforming into ferrite in the cooling process in the previous step, to transform into bainite to promote an increase in the carbon concentration in austenite, retained austenite is formed. By setting the over-aging temperature to be equal to or higher than (the cooling stop temperature+10° C.), there is an improvement in the uniformity of a microstructure as a result of satisfactory temperature uniformity being achieved throughout the width of the steel sheet, and the carbon partitioning into bainite and non-transformed austenite, which are formed when holding is performed at the over-aging temperature, is accurately controlled. Here, at the time of heating, it is preferable that the steel sheet be supplementarily heated by using an IH (Induction Heater) or the like. In addition, in the case where the over-aging temperature is lower than 350° C., since bainite transformation is inhibited, a sufficient amount of retained austenite is not formed as a result of appropriate carbon partitioning not progressing, which results in a deterioration in ductility. In addition, in the case where the over-aging temperature is higher than 550° C., since the decomposition of austenite in which the carbon concentration has been increased occurs due to bainite transformation, it is not possible to achieve the desired ductility. Therefore, the over-aging temperature is set to be 350° C. or higher and 550° C. or lower. Here, as long as the over-aging temperature is 350° C. or higher and 550° C. or lower, temperature modulation is acceptable when over-aging is performed. In addition, an average heating rate from the cooling stop temperature described above to the over-aging temperature is set to be 5.0° C./s or lower from the viewpoint of improving the stability of mechanical properties by decreasing a variation in temperature in the width direction. On the other hand, although there is no particular limitation on the lower limit of the average heating rate, it is preferable that the average heating rate be 0.5° C./s or higher or more preferably 1.0° C./s or higher from the viewpoint of a yield rate. In addition, in the case where a holding time at the over-aging temperature is less than 480 seconds, since there is no increase in the carbon concentration in retained austenite as a result of bainite transformation not progressing appropriately, austenite, which is thermally unstable, transforms into martensite when cooled to room temperature. Consequently, it is not possible to achieve the desired amount of retained austenite. Therefore, the holding time is set to be 480 seconds or more. Although there is no limitation on the upper limit of the holding time, it is preferable that the holding time be 1400 seconds or less.

The method for manufacturing the steel sheet according to aspects of the present invention may further include a coating step of performing a coating treatment on the surface of the annealed steel sheet. By performing a coating treatment, it is possible to obtain a steel sheet having a coating layer on the surface thereof. In the method for manufacturing the steel sheet according to aspects of the present invention, it is preferable that an electro-galvanizing treatment be performed on the surface of the steel sheet as a coating treatment.

The steel sheet may be subjected to skin pass rolling from the viewpoint of stabilizing press formability, for example, by adjusting surface roughness and by flattening a steel sheet shape. Here, in the case where both the coating treatment described above and the skin pass rolling are performed, the skin pass rolling is performed after the coating treatment has been performed.

In the series of heating treatments in the manufacturing method according to aspects of the present invention, it is not necessary that each of the holding temperatures be constant as long as the holding temperature is within the corresponding range described above. In addition, in the case where there is a variation in the cooling rate when cooling is performed, the spirit of the present invention is not impaired as long as the cooling rate is within the range specified above. In addition, the steel sheet may be subjected to the heat treatments by using any kinds of equipment as long as the specified thermal history conditions are satisfied. In addition, performing skin pass rolling on the steel sheet according to aspects of the present invention for shape correction as needed is within the scope of the present invention.

Hereafter, the member and the method for manufacturing the member according to aspects of the present invention will be described.

The member according to aspects of the present invention is a member manufactured by performing at least one of forming and welding on the steel sheet according to aspects of the present invention. In addition, the method for manufacturing a member according to aspects of the present invention includes a step of performing at least one of forming and welding on the steel sheet manufactured by using the method for manufacturing a steel sheet according to aspects of the present invention.

The steel sheet according to aspects of the present invention has high strength, excellent formability, and excellent stability of mechanical properties. Therefore, since the member according to aspects of the present invention, which is manufactured by using the steel sheet according to aspects of the present invention, also has such properties, the member according to aspects of the present invention can preferably be used for parts and the like, which are manufactured by forming a steel sheet into complex shapes. The member according to aspects of the present invention can preferably be used for, for example, automobile frame parts.

Regarding forming, a common forming method such as a press forming method or the like may be used with no restriction. In addition, regarding welding, a common welding method such as spot welding, arc welding, or the like may be used without restriction.

EXAMPLES

Aspects of the present invention will be specifically described with reference to examples. The scope of the present invention is not limited to the examples below.

Example 1

After hot rolled steel sheets were manufactured by performing hot rolling under the conditions given in Table 2 on steel slabs having the chemical compositions given in Table 1 and a thickness of 250 mm, a pickling treatment was performed on the manufactured hot rolled steel sheets. Subsequently, cold rolling was performed on the hot rolled steel sheets which had been subjected to a pickling treatment under the conditions given in Table 2 to manufacture cold rolled steel sheets. Subsequently, after the cold rolled steel sheets were annealed by using a continuous annealing line under the conditions given in Table 2, skin pass rolling was performed on the annealed steel sheets with an elongation ratio of 0.2% to 0.4% to manufacture steel sheets to be evaluated. The obtained steel sheets were evaluated by using the methods below.

TABLE 1

| Steel No. | Chemical Composition (mass %) | | | | | | | | Note |
|---|---|---|---|---|---|---|---|---|---|
| | C | Si | Mn | P | S | Al | N | Others | |
| A | 0.059 | 0.89 | 0.92 | 0.014 | 0.0017 | 0.526 | 0.0038 | — | Conforming Steel |
| B | 0.135 | 1.21 | 1.52 | 0.017 | 0.0011 | 0.017 | 0.0031 | — | Conforming Steel |
| C | 0.210 | 1.48 | 2.10 | 0.010 | 0.0013 | 0.040 | 0.0026 | — | Conforming Steel |
| D | 0.182 | 1.47 | 2.23 | 0.006 | 0.0006 | 0.026 | 0.0028 | — | Conforming Steel |
| E | 0.088 | 1.55 | 1.47 | 0.011 | 0.0005 | 0.022 | 0.0029 | Nb: 0.01 | Conforming Steel |
| F | 0.129 | 1.34 | 2.09 | 0.017 | 0.0011 | 0.017 | 0.0031 | Ni: 0.07 | Conforming Steel |
| G | 0.133 | 1.92 | 1.43 | 0.009 | 0.0018 | 0.036 | 0.0026 | Mg: 0.012 | Conforming Steel |
| H | 0.172 | 1.47 | 2.12 | 0.015 | 0.0006 | 0.026 | 0.0028 | Cr: 0.026, Ni: 0.21 | Conforming Steel |
| I | 0.092 | 2.01 | 1.34 | 0.008 | 0.0012 | 0.019 | 0.0024 | V: 0.3 | Conforming Steel |
| J | 0.234 | 1.87 | 2.91 | 0.014 | 0.0011 | 0.025 | 0.0026 | Cu: 0.2 | Conforming Steel |
| K | 0.110 | 1.48 | 1.86 | 0.010 | 0.0013 | 0.040 | 0.0026 | Ti: 0.02, B: 0.0021 | Conforming Steel |
| L | 0.177 | 1.36 | 2.88 | 0.016 | 0.0006 | 0.026 | 0.0022 | Mo: 0.07 | Conforming Steel |
| N | 0.192 | 1.49 | 2.41 | 0.010 | 0.0007 | 0.031 | 0.0015 | Sb: 0.033 | Conforming Steel |
| M | 0.221 | 1.66 | 1.80 | 0.042 | 0.0020 | 0.017 | 0.0028 | REM: 0.032 | Conforming Steel |
| O | 0.088 | 1.55 | 1.47 | 0.014 | 0.0017 | 0.031 | 0.0038 | — | Conforming Steel |
| P | 0.112 | 1.62 | 2.12 | 0.013 | 0.0023 | 0.026 | 0.0016 | Ca: 0.021 | Conforming Steel |
| Q | 0.036 | 1.10 | 1.47 | 0.015 | 0.0014 | 0.029 | 0.0027 | — | Comparative Steel |
| R | 0.281 | 1.31 | 1.70 | 0.022 | 0.0021 | 0.028 | 0.0031 | — | Comparative Steel |
| S | 0.177 | 0.63 | 2.14 | 0.013 | 0.0008 | 0.492 | 0.0032 | — | Comparative Steel |
| T | 0.201 | 1.61 | 3.11 | 0.008 | 0.0006 | 0.041 | 0.0045 | — | Comparative Steel |
| U | 0.092 | 1.70 | 0.77 | 0.013 | 0.0010 | 0.033 | 0.0043 | — | Comparative Steel |
| V | 0.162 | 1.39 | 2.22 | 0.011 | 0.0007 | 0.029 | 0.0011 | Ti: 0.02, B: 0.0022, Sb: 0.029 | Conforming Steel |

The balance other than the constituents above is Fe and incidental impurities.

TABLE 2

| | | Hot Rolling Step | | | Cold Rolling Step | | Annealing Step | |
|---|---|---|---|---|---|---|---|---|
| | | Steel Slab | Finishing | | Rolling | | | |
| Steel Sheet No. | Steel No. | Heating Temperature (° C.) | Delivery Temperature (° C.) | Cooling Temperature (° C.) | Reduction Ratio (%) | Thickness (mm) | Heating Temperature (° C.) | *1 (° C./s) |
| 1 | A | 1212 | 912 | 637 | 50 | 1.4 | 834 | 10 |
| 2 | A | 1256 | 923 | 629 | 57 | 1.2 | 856 | 14 |
| 3 | A | 1032 | 791 | 435 | 56 | 1.4 | 831 | 18 |
| 4 | A | 1178 | 945 | 498 | 47 | 1.6 | 798 | 16 |
| 5 | A | 1293 | 932 | 586 | 44 | 1.8 | 872 | 21 |
| 6 | B | 1135 | 966 | 467 | 43 | 1.6 | 821 | 24 |
| 7 | B | 1153 | 845 | 589 | 60 | 1.2 | 805 | 20 |
| 8 | B | 1184 | 911 | 444 | 33 | 2.0 | 812 | 9 |
| 9 | C | 1164 | 906 | 623 | 71 | 0.8 | 810 | 8 |
| 10 | C | 1122 | 897 | 476 | 42 | 1.4 | 806 | 16 |
| 11 | D | 1245 | 970 | 567 | 50 | 1.4 | 822 | 18 |
| 12 | E | 1236 | 946 | 624 | 68 | 0.9 | 823 | 21 |
| 13 | E | 1279 | 961 | 663 | 53 | 1.4 | 821 | 8 |
| 14 | E | 1254 | 951 | 623 | 71 | 1.0 | 799 | 7 |
| 15 | F | 1236 | 899 | 610 | 56 | 1.6 | 832 | 16 |
| 16 | F | 1256 | 967 | 735 | 50 | 1.4 | 841 | 18 |
| 17 | G | 1154 | 923 | 578 | 53 | 1.4 | 851 | 20 |

TABLE 2-continued

| Steel Sheet No. | Steel No. | | | | | | | Annealing Step | | | | | |
|---|---|---|---|---|---|---|---|---|---|---|---|---|---|
| | | | | | | | | Finish Cooling Temperature (° C.) | Over-aging Temperature (° C.) | *2 (° C./s) | *3 (° C.) | *4 (s) | Note |
| 18 | H | 1121 | 955 | 563 | 60 | 1.2 | 843 | 7 | | | | | |
| 19 | I | 1265 | 976 | 579 | 41 | 2.0 | 822 | 21 | | | | | |
| 20 | J | 1254 | 909 | 557 | 50 | 1.4 | 832 | 16 | | | | | |
| 21 | K | 1235 | 926 | 621 | 53 | 1.4 | 838 | 18 | | | | | |
| 22 | L | 1281 | 918 | 610 | 50 | 1.4 | 847 | 15 | | | | | |
| 23 | L | 1250 | 972 | 509 | 43 | 1.6 | 852 | 15 | | | | | |
| 24 | L | 1245 | 944 | 632 | 50 | 1.4 | 811 | 16 | | | | | |
| 25 | N | 1190 | 961 | 678 | 56 | 1.4 | 821 | 3 | | | | | |
| 26 | M | 1213 | 922 | 426 | 59 | 1.4 | 823 | 22 | | | | | |
| 27 | O | 1212 | 910 | 498 | 61 | 1.4 | 800 | 10 | | | | | |
| 28 | P | 1212 | 886 | 564 | 50 | 1.4 | 786 | 13 | | | | | |
| 29 | P | 1245 | 935 | 578 | 50 | 1.4 | 762 | 10 | | | | | |
| 30 | Q | 1265 | 926 | 643 | 46 | 1.4 | 812 | 11 | | | | | |
| 31 | R | 1197 | 924 | 658 | 42 | 1.4 | 822 | 18 | | | | | |
| 32 | S | 1241 | 916 | 681 | 53 | 1.4 | 846 | 16 | | | | | |
| 33 | T | 1271 | 933 | 632 | 57 | 1.2 | 811 | 15 | | | | | |
| 34 | U | 1250 | 945 | 633 | 60 | 1.2 | 821 | 15 | | | | | |
| 35 | V | 1125 | 945 | 565 | 60 | 1.2 | 841 | 8 | | | | | |
| 1 | A | | | | | | | 378 | 421 | 4.3 | 43 | 688 | Inventive Example |
| 2 | A | | | | | | | 395 | 412 | 3.0 | 17 | 1232 | Inventive Example |
| 3 | A | | | | | | | 365 | 421 | 4.2 | 56 | 623 | Comparative Example |
| 4 | A | | | | | | | 278 | 394 | 4.0 | 116 | 655 | Comparative Example |
| 5 | A | | | | | | | 451 | 466 | 4.1 | 15 | 641 | Comparative Example |
| 6 | B | | | | | | | 420 | 434 | 3.5 | 14 | 1332 | Inventive Example |
| 7 | B | | | | | | | 524 | 570 | 3.5 | 46 | 1332 | Comparative Example |
| 8 | B | | | | | | | 511 | 531 | 3.2 | 20 | 942 | Comparative Example |
| 9 | C | | | | | | | 416 | 429 | 4.2 | 13 | 645 | Inventive Example |
| 10 | C | | | | | | | 421 | 423 | 1.1 | 2 | 666 | Comparative Example |
| 11 | D | | | | | | | 395 | 411 | 3.1 | 16 | 501 | Inventive Example |
| 12 | E | | | | | | | 377 | 421 | 2.1 | 44 | 1368 | Inventive Example |
| 13 | E | | | | | | | 462 | 488 | 3.3 | 26 | 432 | Comparative Example |
| 14 | E | | | | | | | 421 | 440 | 7.2 | 19 | 1222 | Comparative Example |
| 15 | F | | | | | | | 395 | 420 | 4.1 | 25 | 1210 | Inventive Example |
| 16 | F | | | | | | | 386 | 406 | 2.8 | 20 | 1210 | Comparative Example |
| 17 | G | | | | | | | 366 | 406 | 3.8 | 40 | 699 | Inventive Example |
| 18 | H | | | | | | | 423 | 437 | 4.3 | 14 | 1387 | Inventive Example |
| 19 | I | | | | | | | 409 | 401 | — | −8 | 1290 | Comparative Example |
| 20 | J | | | | | | | 401 | 421 | 2.1 | 20 | 1240 | Inventive Example |
| 21 | K | | | | | | | 399 | 416 | 3.8 | 17 | 1333 | Inventive Example |
| 22 | L | | | | | | | 410 | 422 | 3.9 | 12 | 1221 | Inventive Example |
| 23 | L | | | | | | | 324 | 344 | 2.0 | 20 | 1224 | Comparative Example |
| 24 | L | | | | | | | 541 | 564 | 2.7 | 23 | 1201 | Comparative Example |
| 25 | N | | | | | | | 465 | 477 | 3.2 | 12 | 1264 | Comparative Example |
| 26 | M | | | | | | | 412 | 423 | 4.0 | 11 | 688 | Inventive Example |
| 27 | O | | | | | | | 396 | 408 | 4.1 | 12 | 645 | Inventive Example |
| 28 | P | | | | | | | 411 | 436 | 2.6 | 25 | 1240 | Inventive Example |
| 29 | P | | | | | | | 407 | 422 | 3.3 | 15 | 1221 | Comparative Example |
| 30 | Q | | | | | | | 386 | 409 | 4.6 | 23 | 1232 | Comparative Example |
| 31 | R | | | | | | | 394 | 421 | 3.5 | 27 | 1165 | Comparative Example |
| 32 | S | | | | | | | 421 | 461 | 3.3 | 40 | 1130 | Comparative Example |
| 33 | T | | | | | | | 460 | 482 | 3.2 | 22 | 1213 | Comparative Example |
| 34 | U | | | | | | | 401 | 430 | 4.4 | 29 | 1205 | Comparative Example |
| 35 | V | | | | | | | 420 | 435 | 4.1 | 15 | 1350 | Inventive Example |

*1: average cooling rate from 750° C. to 600° C.
*2: average heating rate from the cooling stop temperature to the over-aging temperature
*3: temperature value calculated by subtracting the cooling stop temperature from the over-aging temperature
*4: holding time at the over-aging temperature (1) Measuring the Area Fraction of a Steel Microstructure An observation specimen was taken from a steel sheet so that the observation surface was a cross section parallel to the rolling direction, and was etched in 1 vol % nital so as to expose a cross section in the thickness direction, and a microstructure image was then taken at a ¼t position, which is located at ¼ of the thickness, by using a scanning electron microscope (SEM) at a magnification of 2000 times. Such microstructure observation was performed in a region having an area of 3000 μm² or more at respective ½w (central position in the width direction), ⅛w, ⅜w, ⅝w, and ⅞w positions. The following items (i) and (ii) were each measured. The results are given in Table 3. Here, "t" denotes a thickness, and "w" denotes a width.

(i) Ferrite and Bainitic Ferrite

Ferrite and bainitic ferrite are both identified as grey regions in a SEM image. Therefore, ferrite and bainitic ferrite were regarded as an identical microstructure in the SEM image, and the total area fraction of ferrite and bainitic ferrite was measured by using a point counting method. The total area fraction of ferrite and bainitic ferrite was measured at respective ½w (central position in the width direction), ⅛w, ⅜w, ⅝w, and ⅞w positions. The average of the values measured at the five positions was defined as the total area fraction of ferrite and bainitic ferrite in accordance with aspects of the present invention.

The average grain size of ferrite and/or bainitic ferrite was calculated by measuring an average intercept length on the basis of grain boundaries with other microstructures by using an intercept method and by converting the obtained average intercept length to an equivalent circular diameter. The average grain size was measured at respective ½w (central position in the width direction), ⅛w, ⅜w, ⅝w, and ⅞w positions. The average of the values measured at the five positions was defined as the average grain size (hereinafter, referred to as "average grain size F") of ferrite and/or bainitic ferrite on the basis of a distribution in the width direction of the steel sheet.

The standard deviation (hereinafter, referred to as "standard deviation F") of the grain size of ferrite and/or bainitic ferrite on the basis of a distribution in the width direction of the steel sheet was calculated as the standard deviation of a population consisting of the five values of average grain size measured at the respective ½w (central position in the width direction), ⅛w, ⅜w, ⅝w, and ⅞w positions described above.

In addition, "the ratio (%) of the standard deviation of the grain size of ferrite and/or bainitic ferrite to the average grain size of ferrite and/or bainitic ferrite on the basis of a distribution in the width direction of the steel sheet" was calculated by dividing the standard deviation F by the average grain size F, that is, by using the formula "((standard deviation F)/(average grain size F))×100(%)".

(ii) As-Quenched Martensite and Retained Austenite

Since as-quenched martensite and retained austenite are both identified as white regions in a SEM image, it is not possible to distinguish between as-quenched martensite and retained austenite. Therefore, the area fraction of retained austenite was separately measured by using the method described below. In addition, the area fraction of as-quenched martensite was measured by subtracting the area fraction of the retained austenite, which was measured by using the method described below, from the total area fraction of as-quenched martensite and retained austenite, which was measured by using a point counting method in the SEM image. The area fraction of as-quenched martensite was measured at respective ½w (central position in the width direction), ⅛w, ⅜w, ⅝w, and ⅞w positions. Specifically, the area fraction of as-quenched martensite at a ½w position (central position in the width direction) was measured by subtracting the area fraction of retained austenite measured at the ½w position (central position in the width direction) from the total area fraction of as-quenched martensite and retained austenite measured at the ½w position (central position in the width direction). In a similar manner, the area fraction of as-quenched martensite was measured at respective ⅛w, ⅜w, ⅝w, and ⅞w positions. In addition, the average of the values measured at the five positions was defined as the area fraction of as-quenched martensite (hereinafter, referred to as "area fraction M") in accordance with aspects of the present invention.

In addition, the standard deviation (hereinafter, referred to as "standard deviation M") of the area fraction of as-quenched martensite on the basis of a distribution in the width direction of the steel sheet was calculated as the standard deviation of a population consisting of the five values of the area fraction of as-quenched martensite measured at respective ½w (central position in the width direction), ⅛w, ⅜w, ⅝w, and ⅞w positions.

In addition, "the ratio (%) of the standard deviation of the area fraction of as-quenched martensite to the area fraction of as-quenched martensite on the basis of a distribution in the width direction of the steel sheet" was calculated by dividing the standard deviation M by the area fraction M, that is, by using the formula "((standard deviation M)/(area fraction M))×100(%)".

(2) Measuring the Area Fraction of Retained Austenite

The volume fraction of retained austenite was measured by polishing the surface of a steel sheet in the thickness direction to the position located at ¼ of the thickness, by further performing chemical polishing on the polished surface to remove a thickness of 0.1 mm, by measuring, by means of an X-ray diffractometer with the Kα-ray of Mo, the integrated reflection intensities from the (200)-plane, (220)-plane, and (311)-plane of fcc-iron (austenite) and from the (200)-plane, (211)-plane, and (220)-plane of bcc-iron (ferrite), and by calculating the volume fraction from the ratio of the integrated reflection intensity from the planes of fcc-iron (austenite) to the integrated reflection intensity from the planes of bcc-iron (ferrite). In accordance with aspects of the present invention, the volume fraction of retained austenite was regarded as the area fraction of retained austenite. Such measurement was performed at respective ½w (central position in the width direction), ⅛w, ⅜w, ⅝w, and ⅞w positions. In addition, the average of the values measured at the five positions is defined as the area fraction of retained austenite (hereinafter, referred to as "area fraction R") in accordance with aspects of the present invention.

In addition, the standard deviation (hereinafter, referred to as "standard deviation R") of the area fraction of retained austenite on the basis of a distribution in the width direction of the steel sheet was calculated as the standard deviation of a population consisting of the five values of the area fraction of retained austenite measured at respective ½w (central position in the width direction), ⅛w, ⅜w, ⅝w, and ⅞w positions.

In addition, "the ratio (%) of the standard deviation of the area fraction of retained austenite to the area fraction of retained austenite on the basis of a distribution in the width direction of the steel sheet" was calculated by dividing the standard deviation R by the area fraction R, that is, by using the formula "((standard deviation R)/(area fraction R))×100 (%)".

TABLE 3

| Steel Sheet No. | Ferrite and/or Bainitic Ferrite | | | | As-quenched martensite | | | Retained Austenite | | | Remaining Microstructure Area | Note |
|---|---|---|---|---|---|---|---|---|---|---|---|---|
| | *1 (%) | *2 (μm) | *3 (Δμm) | *4 (%) | *5 (%) | *6 (Δ %) | *7 (%) | *8 (%) | *9 (Δ %) | *10 (%) | Fraction (%) | |
| 1 | 86 | 6.4 | 0.4 | 6 | 9 | 0.8 | 9 | 5 | 0.4 | 9 | 0 | Inventive Example |
| 2 | 85 | 6.3 | 0.5 | 8 | 9 | 0.3 | 3 | 6 | 0.4 | 7 | 0 | Inventive Example |

TABLE 3-continued

| Steel Sheet No. | Ferrite and/or Bainitic Ferrite | | | | As-quenched martensite | | | Retained Austenite | | | Remaining Microstructure Area Fraction (%) | Note |
|---|---|---|---|---|---|---|---|---|---|---|---|---|
| | *1 (%) | *2 (μm) | *3 (Δμm) | *4 (%) | *5 (%) | *6 (Δ %) | *7 (%) | *8 (%) | *9 (Δ %) | *10 (%) | | |
| 3 | 84 | 6.5 | 1.2 | 18 | 9 | 1.7 | 19 | 7 | 0.6 | 8 | 0 | Comparative Example |
| 4 | 83 | 6.4 | 0.4 | 6 | 8 | 1.2 | 15 | 5 | 0.3 | 6 | 4 | Comparative Example |
| 5 | 87 | 8.8 | 0.3 | 3 | 8 | 0.5 | 6 | 5 | 0.3 | 6 | 0 | Comparative Example |
| 6 | 75 | 4.3 | 0.4 | 9 | 14 | 0.4 | 3 | 11 | 0.7 | 6 | 0 | Inventive Example |
| 7 | 71 | 5.1 | 0.2 | 4 | 12 | 0.6 | 5 | 3 | 0.5 | 15 | 14 | Comparative Example |
| 8 | 76 | 6.8 | 1.0 | 15 | 13 | 0.8 | 6 | 11 | 0.3 | 3 | 0 | Comparative Example |
| 9 | 76 | 5.1 | 0.3 | 6 | 13 | 0.7 | 5 | 11 | 0.7 | 7 | 0 | Inventive Example |
| 10 | 78 | 4.9 | 0.4 | 8 | 14 | 1.1 | 8 | 8 | 1.3 | 16 | 0 | Comparative Example |
| 11 | 76 | 4.3 | 0.3 | 7 | 14 | 0.6 | 4 | 10 | 0.6 | 6 | 0 | Inventive Example |
| 12 | 79 | 5.3 | 0.4 | 8 | 10 | 0.8 | 8 | 11 | 0.7 | 6 | 0 | Inventive Example |
| 13 | 85 | 5.4 | 0.5 | 9 | 12 | 0.8 | 7 | 3 | 0.3 | 9 | 0 | Comparative Example |
| 14 | 78 | 4.4 | 0.3 | 7 | 13 | 0.6 | 5 | 9 | 1.8 | 20 | 0 | Comparative Example |
| 15 | 80 | 4.2 | 0.2 | 5 | 9 | 0.8 | 9 | 11 | 0.4 | 4 | 0 | Inventive Example |
| 16 | 78 | 8.6 | 0.5 | 6 | 10 | 0.8 | 8 | 12 | 0.9 | 8 | 0 | Comparative Example |
| 17 | 73 | 4.5 | 0.4 | 9 | 15 | 0.9 | 6 | 12 | 0.6 | 5 | 0 | Inventive Example |
| 18 | 74 | 4.2 | 0.3 | 7 | 15 | 1.4 | 9 | 11 | 0.3 | 3 | 0 | Inventive Example |
| 19 | 83 | 5.6 | 0.4 | 7 | 11 | 0.8 | 8 | 6 | 1.8 | 28 | 0 | Comparative Example |
| 20 | 84 | 6.1 | 0.5 | 8 | 10 | 0.8 | 8 | 6 | 0.2 | 3 | 0 | Inventive Example |
| 21 | 76 | 6.7 | 0.5 | 7 | 14 | 1.3 | 9 | 10 | 0.8 | 8 | 0 | Inventive Example |
| 22 | 75 | 4.3 | 0.3 | 7 | 15 | 1.2 | 8 | 10 | 0.6 | 6 | 0 | Inventive Example |
| 23 | 74 | 5.0 | 0.3 | 6 | 23 | 1.8 | 8 | 3 | 0.2 | 6 | 0 | Comparative Example |
| 24 | 74 | 4.9 | 0.4 | 8 | 13 | 1.2 | 9 | 5 | 0.3 | 6 | 8 | Comparative Example |
| 25 | 91 | 6.8 | 0.3 | 4 | 3 | 0.1 | 4 | 1 | 0.1 | 9 | 5 | Comparative Example |
| 26 | 76 | 4.8 | 0.3 | 6 | 14 | 1.0 | 7 | 10 | 0.8 | 8 | 0 | Inventive Example |
| 27 | 85 | 6.3 | 0.4 | 6 | 9 | 0.6 | 7 | 6 | 0.3 | 5 | 0 | Inventive Example |
| 28 | 74 | 6.7 | 0.6 | 9 | 14 | 1.1 | 8 | 13 | 0.8 | 6 | 0 | Inventive Example |
| 29 | 62 | 6.4 | 0.3 | 5 | 17 | 1.6 | 9 | 21 | 1.2 | 6 | 0 | Comparative Example |
| 30 | 82 | 6.3 | 0.5 | 8 | 15 | 0.9 | 6 | 3 | 0.2 | 6 | 0 | Comparative Example |
| 31 | 59 | 4.5 | 0.4 | 9 | 22 | 2.3 | 10 | 19 | 2.1 | 11 | 0 | Comparative Example |
| 32 | 77 | 6.4 | 0.5 | 8 | 19 | 1.2 | 6 | 3 | 0.3 | 9 | 1 | Comparative Example |
| 33 | 68 | 5.6 | 0.9 | 16 | 16 | 2.1 | 13 | 16 | 2.1 | 13 | 0 | Comparative Example |
| 34 | 78 | 6.3 | 0.4 | 6 | 19 | 1.5 | 8 | 3 | 0.3 | 9 | 0 | Comparative Example |
| 35 | 75 | 4.3 | 0.2 | 5 | 14 | 1.2 | 9 | 11 | 0.3 | 3 | 0 | Inventive Example |

*1: total area fraction of ferrite and bainitic ferrite
*2: average grain size (average grain size F)
*3: standard deviation of the grain size on the basis of a distribution in the width direction of the steel sheet (standard deviation F)
*4: ratio of the standard deviation of the grain size to the average grain size on the basis of a distribution in the width direction of the steel sheet (((standard deviation F)/(average grain size F)) × 100 (%))
*5: area fraction (area fraction M)
*6: standard deviation of the area fraction on the basis of a distribution in the width direction of the steel sheet (standard deviation M)
*7: ratio of the standard deviation of the area fraction to the area fraction on the basis of a distribution in the width direction of the steel sheet (((standard deviation M)/(area fraction M)) × 100 (%))
*8: area fraction (area fraction R)
*9: standard deviation of the area fraction on the basis of a distribution in the width direction of the steel sheet (standard deviation R)
*10: ratio of the standard deviation of the area fraction to the area fraction on the basis of a distribution in the width direction of the steel sheet (((standard deviation R)/(area fraction R)) × 100 (%))

(3) Tensile Test

A JIS No. 5 tensile test specimen whose tensile direction was perpendicular to the rolling direction was taken from each of ½w (central position in the width direction), ⅛w, ⅜w, ⅝w, and ⅞w positions of each obtained steel sheet. A tensile test was performed on each test specimen in accordance with the prescription in JIS Z 2241 (2011). The cross-head speed in the tensile test was set to be 10 mm/min. Here, two test specimens were taken from each of the measurement positions, measurement was performed twice for each of the measurement positions, and the average of the two measured values was calculated as the measured value for each of the measurement positions.

By performing a tensile test as described above, tensile strength (TS) was measured at respective ½w (central position in the width direction), ⅛w, ⅜w, ⅝w, and ⅞w positions. The average of the values measured at the five positions was defined as the tensile strength (hereinafter, referred to as "measured value TS") in accordance with aspects of the present invention.

In addition, the standard deviation (hereinafter, referred to as "standard deviation TS") of tensile strength on the basis of a distribution in the width direction of the steel sheet was calculated as the standard deviation of a population consisting of the five values of tensile strength (TS) measured at respective ½w (central position in the width direction), ⅛w, ⅜w, ⅝w, and ⅞w positions.

In addition, in accordance with aspects of the present invention, "the ratio (%) of the standard deviation of tensile strength to tensile strength on the basis of a distribution in the width direction of the steel sheet" was calculated by dividing the standard deviation TS by the measured value TS, that is, by using the formula "((standard deviation TS)/(measured value TS))×100(%)".

In addition, by performing a tensile test as described above, total elongation (El) was measured at respective ½w (central position in the width direction), ⅛w, ⅜w, ⅝w, and ⅞w positions. The average of the values measured at the five positions was defined as the total elongation (hereinafter, referred to as "measured value El") in accordance with aspects of the present invention.

In addition, the standard deviation (hereinafter, referred to as "standard deviation El") of total elongation on the basis of a distribution in the width direction of the steel sheet was calculated as the standard deviation of a population consisting of the five values of total elongation (El) measured at respective ½w (central position in the width direction), ⅛w, ⅜w, ⅝w, and ⅞w positions.

In addition, in accordance with aspects of the present invention, "the ratio (%) of the standard deviation of total elongation to total elongation on the basis of a distribution in the width direction of the steel sheet" was calculated by dividing the standard deviation El by the measured value El, that is, by using the formula "((standard deviation El)/(measured value El))×100(%)".

(4) Hole Expansion Test

A test specimen having a size of 100 mm×100 mm was taken from each of ½w (central position in the width direction), ⅛w, ⅜w, ⅝w, and ⅞w positions of a steel sheet, a hole expansion test was performed on each test specimen in accordance with the prescription in JFS T 1001 (The Japan Iron and Steel Federation Standard) in such a manner that the test was performed three times for each of the positions from which the test specimens were taken, and the average of the three measured values was defined as a hole expansion ratio λ (%) for each of the positions from which the test specimens are taken. The average of the values measured at the five positions was defined as the hole expansion ratio λ (%) (hereinafter, referred to as "measured value λ (%)") in accordance with aspects of the present invention.

In addition, the standard deviation (hereinafter, referred to as "standard deviation λ") of a hole expansion ratio λ on the basis of a distribution in the width direction of the steel sheet was calculated as the standard deviation of a population consisting of the five values of hole expansion ratio λ (%) measured at respective ½w (central position in the width direction), ⅛w, ⅜w, ⅝w, and ⅞w positions.

In addition, in accordance with aspects of the present invention, "the ratio (%) of the standard deviation of a hole expansion ratio to a hole expansion ratio on the basis of a distribution in the width direction of the steel sheet" was calculated by dividing the standard deviation λ by the measured value λ, that is, by using the formula "((standard deviation λ)/(measured value λ))×100(%)".

(5) Evaluation

In accordance with aspects of the present invention, a case where tensile strength (TS)×total elongation (El)≥24000 MPa·% or more and item (A1) or (A2) below was satisfied by the hole expansion ratio λ (%) was evaluated as a case of excellent formability.

(A1) the hole expansion ratio λ is 60% or more in the case where the tensile strength is 590 MPa or more and less than 780 MPa (A2) the hole expansion ratio λ is 30% or more in the case where the tensile strength is 780 MPa or more In the examples of the present invention, a case where all of items (B1), (B2), and (B3) below were satisfied was evaluated as a case of excellent stability of mechanical properties.

(B1) on the basis of a distribution in the width direction of the steel sheet, the ratio of the standard deviation of the tensile strength to the tensile strength is 3% or less (B2) on the basis of a distribution in the width direction of the steel sheet, the ratio of the standard deviation of the total elongation to the total elongation is 2% or less (B3) on the basis of a distribution in the width direction of the steel sheet, the ratio of the standard deviation of the hole expansion ratio to the hole expansion ratio is 10% or less

TABLE 4

| Steel Sheet No. | Tensile Strength (TS) | | | Total Elongation (El) | | | TS × El (MPa · %) | Hole Expansion Ratio λ | | | Note |
|---|---|---|---|---|---|---|---|---|---|---|---|
| | Measured Value TS (MPa) | Standard Deviation TS (ΔMPa) | *1 (%) | Measured Value El (%) | Standard Deviation El (Δ %) | *2 (%) | | Measured Value λ (%) | Standard Deviation λ (Δ %) | *3 (%) | |
| 1 | 619 | 15 | 2 | 42.1 | 1.0 | 2 | 26060 | 67 | 4.8 | 7 | Inventive Example |
| 2 | 611 | 13 | 2 | 40.9 | 0.9 | 2 | 24990 | 69 | 3.3 | 5 | Inventive Example |
| 3 | 622 | 32 | 5 | 38.9 | 0.8 | 2 | 24196 | 66 | 11.3 | 17 | Comparative Example |
| 4 | 613 | 12 | 2 | 39.8 | 0.3 | 1 | 24397 | 62 | 10.1 | 16 | Comparative Example |
| 5 | 576 | 13 | 2 | 38.4 | 0.4 | 1 | 22118 | 64 | 3.4 | 5 | Comparative Example |
| 6 | 799 | 15 | 2 | 31.2 | 0.5 | 2 | 24929 | 34 | 2.1 | 6 | Inventive Example |
| 7 | 832 | 12 | 1 | 22.1 | 2.4 | 11 | 18387 | 35 | 3.2 | 9 | Comparative Example |
| 8 | 852 | 42 | 5 | 28.4 | 0.3 | 1 | 24197 | 33 | 3.0 | 9 | Comparative Example |
| 9 | 815 | 21 | 3 | 30.4 | 0.4 | 1 | 24776 | 42 | 2.4 | 6 | Inventive Example |
| 10 | 812 | 13 | 2 | 31.1 | 0.8 | 3 | 25253 | 34 | 2.8 | 8 | Comparative Example |
| 11 | 803 | 16 | 2 | 32.2 | 0.3 | 1 | 25857 | 40 | 2.9 | 7 | Inventive Example |
| 12 | 812 | 12 | 1 | 30.8 | 0.4 | 1 | 25010 | 36 | 2.1 | 6 | Inventive Example |
| 13 | 821 | 15 | 2 | 22.4 | 0.5 | 2 | 18390 | 33 | 3.1 | 9 | Comparative Example |
| 14 | 811 | 13 | 2 | 30.1 | 1.1 | 4 | 24411 | 42 | 2.9 | 7 | Comparative Example |
| 15 | 800 | 15 | 2 | 31.1 | 0.4 | 1 | 24880 | 43 | 4.0 | 9 | Inventive Example |
| 16 | 622 | 13 | 2 | 29.4 | 0.3 | 1 | 18287 | 38 | 3.2 | 8 | Comparative Example |
| 17 | 788 | 15 | 2 | 32.9 | 0.4 | 1 | 25925 | 34 | 2.9 | 9 | Inventive Example |
| 18 | 803 | 14 | 2 | 31.1 | 0.6 | 2 | 24973 | 39 | 2.6 | 7 | Inventive Example |
| 19 | 621 | 15 | 2 | 42.0 | 2.2 | 5 | 26082 | 67 | 3.4 | 5 | Comparative Example |
| 20 | 615 | 13 | 2 | 41.6 | 0.4 | 1 | 25584 | 69 | 6.5 | 9 | Inventive Example |
| 21 | 799 | 12 | 2 | 33.3 | 0.7 | 2 | 26607 | 34 | 1.2 | 4 | Inventive Example |
| 22 | 798 | 10 | 1 | 32.0 | 0.5 | 2 | 25536 | 36 | 1.7 | 5 | Inventive Example |
| 23 | 834 | 9 | 1 | 28.8 | 0.8 | 3 | 24019 | 19 | 1.3 | 7 | Comparative Example |
| 24 | 851 | 10 | 1 | 21.1 | 0.3 | 1 | 17956 | 33 | 1.6 | 5 | Comparative Example |
| 25 | 524 | 12 | 2 | 26.2 | 0.4 | 2 | 13729 | 34 | 2.4 | 7 | Comparative Example |
| 26 | 814 | 8 | 1 | 31.1 | 0.3 | 1 | 25315 | 33 | 1.4 | 4 | Inventive Example |
| 27 | 621 | 16 | 3 | 41.3 | 0.2 | 0 | 25647 | 66 | 2.9 | 4 | Inventive Example |
| 28 | 823 | 9 | 1 | 29.6 | 0.4 | 1 | 24361 | 32 | 2.4 | 8 | Inventive Example |
| 29 | 865 | 10 | 1 | 24.5 | 0.3 | 1 | 21193 | 22 | 1.2 | 5 | Comparative Example |

TABLE 4-continued

| Steel Sheet No. | Tensile Strength (TS) | | | Total Elongation (El) | | | TS × El (MPa · %) | Hole Expansion Ratio λ | | | Note |
|---|---|---|---|---|---|---|---|---|---|---|---|
| | Measured Value TS (MPa) | Standard Deviation TS (ΔMPa) | *1 (%) | Measured Value El (%) | Standard Deviation El (Δ %) | *2 (%) | | Measured Value λ (%) | Standard Deviation λ (Δ %) | *3 (%) | |
| 30 | 557 | 11 | 2 | 31.1 | 0.2 | 1 | 17323 | 34 | 3.3 | 10 | Comparative Example |
| 31 | 823 | 13 | 2 | 29.9 | 1.1 | 4 | 24608 | 25 | 4.6 | 18 | Comparative Example |
| 32 | 824 | 12 | 1 | 22.1 | 0.3 | 1 | 18210 | 36 | 2.8 | 8 | Comparative Example |
| 33 | 835 | 48 | 6 | 29.4 | 1.8 | 6 | 24549 | 34 | 4.8 | 14 | Comparative Example |
| 34 | 822 | 18 | 2 | 27.4 | 0.2 | 1 | 22523 | 36 | 2.0 | 6 | Comparative Example |
| 35 | 805 | 14 | 2 | 30.7 | 0.6 | 2 | 24714 | 40 | 2.6 | 7 | Inventive Example |

*1: ratio of the standard deviation of tensile strength to tensile strength on the basis of a distribution in the width direction of the steel sheet (((standard deviation TS)/(measured value TS)) × 100 (%))
*2: ratio (%) of the standard deviation of total elongation to total elongation on the basis of a distribution in the width direction of the steel sheet (((standard deviation El)/(measured value El)) × 100 (%))
*3: ratio (%) of the standard deviation of a hole expansion ratio to a hole expansion ratio on the basis of a distribution in the width direction of the steel sheet (((standard deviation λ)/(measured value λ)) × 100 (%))
TS × El: product of the tensile strength (measured value TS) and the total elongation (measured value El)

As indicated in Table 3 and Table 4, the steel sheets of the examples of the present invention had a tensile strength of 590 MPa or more, excellent formability, and excellent stability of mechanical properties. On the other hand, the steel sheets of the comparative examples were poorer than the steel sheets of the examples of the present invention in terms of at least one of such properties.

Example 2

A member of an example of the present invention was manufactured by forming steel sheet No. 1 (example of the present invention) given in Table 4 in Example 1 by performing press forming. Moreover, a member of an example of the present invention was manufactured by joining steel sheet No. 1 given in table 4 in Example 1 and steel sheet No. 2 (example of the present invention) given in Table 4 in Example 1 by performing spot welding. It was easy to form the members of the examples of the present invention, which were manufactured by using the steel sheets according to aspects of the present invention, into complex shapes, and these members had high strength and excellent stability of mechanical properties. Therefore, in the case of all of 100 samples of the members manufactured by forming steel sheet No. 1 (example of the present invention) given in Table 4 in Example 1 and all of 100 samples of the members manufactured by joining steel sheet No. 1 given in table 4 in Example 1 and steel sheet No. 2 (example of the present invention) given in Table 4 in Example 1 by performing spot welding, a forming defect such as cracking or the like was not observed, demonstrating that these examples can preferably be used for automobile frame members and the like.

Example 3

A member of an example of the present invention was manufactured by forming a galvanized steel sheet prepared by performing a galvanizing treatment on manufacturing conditions No. 1 (example of the present invention) given in Table 2 in Example 1 by performing press forming. Moreover, a member of an example of the present invention was manufactured by joining a galvanized steel sheet prepared by performing a galvanizing treatment on manufacturing conditions No. 1 (example of the present invention) given in Table 2 in Example 1 and a galvanized steel sheet prepared by performing a galvanizing treatment on manufacturing conditions No. 2 (example of the present invention) given in Table 2 in Example 1 by performing spot welding. It was easy to form these members of the examples of the present invention into complex shapes, and these members had high strength and excellent stability of mechanical properties.

The invention claimed is:

1. A steel sheet having a chemical composition containing, by mass %:
   C: 0.05% or more and 0.25% or less,
   Si: 0.80% or more and 2.20% or less,
   Mn: 0.80% or more and 3.0% or less,
   P: 0.042% or less,
   S: 0.005% or less,
   Al: 0.70% or less,
   N: 0.0060% or less, and
   a balance being Fe and incidental impurities,
   the steel sheet having a steel microstructure including, in terms of area fraction, ferrite and bainitic ferrite in a total amount of 60% or more and 90% or less, as-quenched martensite in an amount of 5% or more and 20% or less, retained austenite in an amount of 4% or more and 20% or less, and a balance including tempered martensite being in an amount of 5% or less,
   wherein an average grain size of the ferrite and/or the bainitic ferrite is 7.0 μm or less,
   wherein, on the basis of a distribution in the width direction of the steel sheet, a ratio of a standard deviation of the grain size of the ferrite and/or the bainitic ferrite to the average grain size of the ferrite and/or the bainitic ferrite is 10% or less,
   wherein, on the basis of a distribution in the width direction of the steel sheet, a ratio of a standard deviation of the area fraction of the as-quenched martensite to the area fraction of the as-quenched martensite is 10% or less, and
   wherein, on the basis of a distribution in the width direction of the steel sheet, a ratio of a standard deviation of the area fraction of the retained austenite to the area fraction of the retained austenite is 10% or less.

2. The steel sheet according to claim 1, wherein the chemical composition further contains, by mass %, at least one element selected from at least one group of:
   group A:
   Ti: 0.2% or less,
   Nb: 0.2% or less,
   V: 0.5% or less,
   Cu: 0.5% or less,
   Ni: 0.5% or less,
   Cr: 1.0% or less, and
   B: 0.0050% or less, group B:
- Mo: 1.0% or less,
- Sb: 0.050% or less,
- REM: 0.050% or less,
- Mg: 0.050% or less, and
- Ca: 0.050% or less.

3. The steel sheet according to claim 1, the steel sheet having a coating layer on a surface thereof.

4. The steel sheet according to claim 2, the steel sheet having a coating layer on a surface thereof.

5. A member manufactured by performing at least one of forming and welding on the steel sheet according to claim 1.

6. A member manufactured by performing at least one of forming and welding on the steel sheet according to claim 2.

7. A member manufactured by performing at least one of forming and welding on the steel sheet according to claim 3.

8. A member manufactured by performing at least one of forming and welding on the steel sheet according to claim 4.

9. A method for manufacturing the steel sheet according to claim 1, the method comprising:
- a hot rolling step of heating a steel slab having the chemical composition according to claim 1 to a temperature of 1100° C. or higher and 1300° C. or lower, performing hot rolling on the heated steel slab with a finish rolling delivery temperature of 800° C. or higher and 1000° C. or lower, and coiling the hot rolled steel sheet at a coiling temperature of 400° C. or higher and 700° C. or lower to obtain a hot rolled steel sheet,
- a pickling treatment step of performing a pickling treatment on the hot rolled steel sheet,
- a cold rolling step of performing cold rolling on a pickled hot rolled steel sheet with a rolling reduction ratio of 40% or more to obtain a cold rolled steel sheet, and
- an annealing step of heating the cold rolled steel sheet to a temperature range of 780° C. or higher and 860° C. or lower, cooling to a cooling stop temperature of 300° C. or higher and 540° C. or lower at an average cooling rate of 6° C./s or higher and 25° C./s or lower in a temperature range from 750° C. to 600° C., heating to an over-aging temperature which is equal to or higher than (the cooling stop temperature+10° C.) and which is 350° C. or higher and 550° C. or lower at an average heating rate of 4.3° C./s or lower, and holding at the over-aging temperature for 480 seconds or more; thereby producing the steel sheet of claim 1.

10. A method for manufacturing the steel sheet accordign to claim 2, the method comprising:
- a hot rolling step of heating a steel slab having the chemical composition according to claim 1 to a temperature of 1100° C. or higher and 1300° C. or lower, performing hot rolling on the heated steel slab with a finish rolling delivery temperature of 800° C. or higher and 1000° C. or lower, and coiling the hot rolled steel sheet at a coiling temperature of 400° C. or higher and 700° C. or lower to obtain a hot rolled steel sheet,
- a pickling treatment step of performing a pickling treatment on the hot rolled steel sheet,
- a cold rolling step of performing cold rolling on a pickled hot rolled steel sheet with a rolling reduction ratio of 40% or more to obtain a cold rolled steel sheet, and
- an annealing step of heating the cold rolled steel sheet to a temperature range of 780° C. or higher and 860° C. or lower, cooling to a cooling stop temperature of 300° C. or higher and 540° C. or lower at an average cooling rate of 6° C./s or higher and 25° C./s or lower in a temperature range from 750° C. to 600° C., heating to an over-aging temperature which is equal to or higher than (the cooling stop temperature+10° C.) and which is 350° C. or higher and 550° C. or lower at an average heating rate of 4.3° C./s or lower, and holding at the over-aging temperature for 480 seconds or more; thereby producing the steel sheet of claim 2.

11. The method for manufacturing a steel sheet according to claim 9, the method further comprising a coating step of performing a coating treatment on a surface of the annealed steel sheet.

12. The method for manufacturing a steel sheet according to claim 10, the method further comprising a coating step of performing a coating treatment on a surface of the annealed steel sheet.

13. A method for manufacturing a member, the method comprising a step of performing at least one of forming and welding on the steel sheet manufactured by using the method for manufacturing a steel sheet according to claim 9.

14. A method for manufacturing a member, the method comprising a step of performing at least one of forming and welding on the steel sheet manufactured by using the method for manufacturing a steel sheet according to claim 10.

15. A method for manufacturing a member, the method comprising a step of performing at least one of forming and welding on the steel sheet manufactured by using the method for manufacturing a steel sheet according to claim 11.

16. A method for manufacturing a member, the method comprising a step of performing at least one of forming and welding on the steel sheet manufactured by using the method for manufacturing a steel sheet according to claim 12.

17. A method for manufacturing a member, the method comprising a step of performing at least one of forming and welding on the steel sheet according to claim 1.

18. A method for manufacturing a member, the method comprising a step of performing at least one of forming and welding on the steel sheet according to claim 2.

19. A method for manufacturing a member, the method comprising a step of performing at least one of forming and welding on the steel sheet according to claim 3.

20. A method for manufacturing a member, the method comprising a step of performing at least one of forming and welding on the steel sheet according to claim 4.

* * * * *